United States Patent Office 3,338,846
Patented Aug. 29, 1967

3,338,846
CELLULAR PLASTIC COMPOSITIONS
Oskar E. H. Klopfer, Bloomfield Hills, Mich., assignor to Ethyl Corporation, New York, N.Y., a corporation of Virginia
No Drawing. Filed May 1, 1964, Ser. No. 364,317
15 Claims. (Cl. 260—2.5)

ABSTRACT OF THE DISCLOSURE

Plastic foams can be produced by expansion of a frothable composition with the gases and vapors produced by the decomposition of a urethane formed from a tertiary alcohol. For example, a polyvinyl chloride-containing foam can be produced by expansion of a frothable composition containing the polyvinyl chloride and a urethane derived from toluene-2,4-diisocyanate and tert-butanol.

---

This invention relates to a novel process for the preparation of cellular plastic compositions and to the novel foams produced thereby. More specifically, this invention relates to a process for the preparation of a foamed plastic, said process comprising an expansion of a frothable composition with the gases and vapors produced by the decomposition of one or more urethanes derived from one or more monohydric tertiary alcohols. Furthermore, this invention relates to a novel class of low-density foams which contain a high percentage of a polyvinyl halide.

Among the objects of this invention is the provision of a novel method for the expansion of a frothable composition. A further object is to provide a process for expansion of an expandable composition which affords a large quantity of useable gases and vapors. Another object is to provide a set cellular product having closed cells that envelop a gaseous mixture of carbon dioxide and an olefin. Another object is to provide novel polyvinyl halide-polyurethane foams which contain a high percentage of a polyvinyl halide. Additional objects will be apparent from the following detailed description and appended claims.

A known process for the preparation of gas to expand a frothable mixture comprises the reaction of water with an isocyanate. This process produces one molecule of carbon dioxide for each isocyanate radical reacted with water. Equations $A_1$ and $A_2$, depicting the reaction of toluene 2,4-diisocyanate, illustrates this process.

($A_1$)

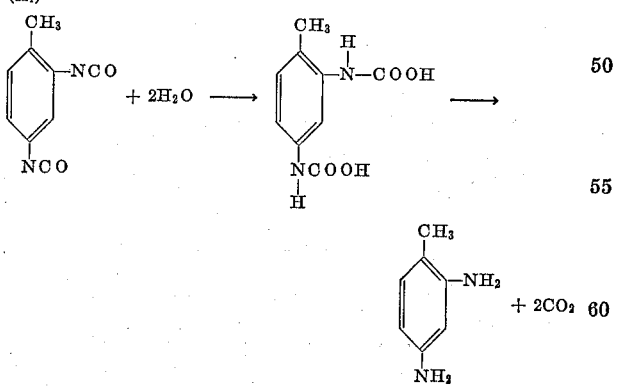

($A_2$)

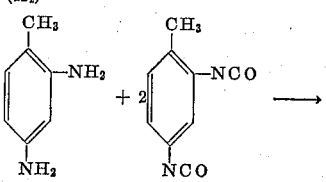

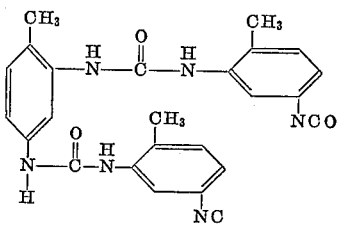

This invention comprises the discovery that the amount of gas available for expansion of a frothable composition can be increased by substantially 100 percent, if a monohydric tertiary alcohol is substituted for the water employed in the prior art process. Although not bound by any theory, it is believed that this novel process can be depicted by Equations B and C below, wherein the monohydric tertiary alcohol is tert-butanol.

(B)

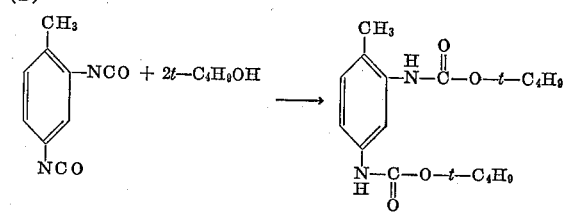

(C)

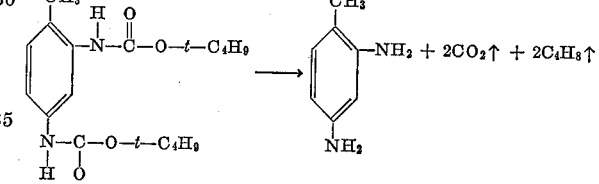

(I)

As illustrated by Equation C, one molecule of carbon dioxide and one molecule of olefin vapor (in the process illustrated, isobutylene, $C_4H_8$) are produced from each isocyanate radical reacted with a tertiary alcohol. Hence, the amount of blowing gas prepared is twice that obtained by the prior art method. The amine produced in Equation C can also react with additional isocyanate as depicted in Equation $A_2$.

Although not bound by any theory, it is believed that the carbamic acid

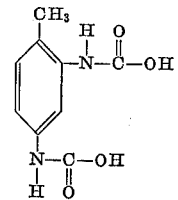

is an intermediate in the reaction of Equation C. In other words, it is presumed that the decomposition of the urethanes employed as blowing agents in this invention involves two steps: the first being a rearrangement and decomposition of the urethane to form a carbamic acid and an isoolefin; and the second, a decomposition of a carbamic acid, thus formed, into carbon dioxide and the corresponding amine.

Comparison of the structural formulas in Equations B and C demonstrate that the amine produced by the composition of the urethane corresponds to the isocyanate from which the urethane is derived. In other words, the amine has the same composition as the isocyanate except that a $>C=O$ fragment in the isocyanate (which has been reacted with the tertiary alcohol) is replaced with two hydrogen atoms. The isoolefin produced in the process of this invention corresponds to the tertiary alcohol from which the urethane was derived, except for the elements of water.

Hence, this invention provides a process for the preparation of a cellular plastic product which comprises heating an expandable plastic composition containing a monomeric urethane of a monohydric saturated tertiary alcohol; said alcohol having from 4 to about 8 carbon atoms, and being free of active hydrogens other than the hydrogen in the hydroxy radical of said alcohol; said urethane having a decomposition temperature such that, at said decomposition temperature, said urethane decomposes into an amine, an isoolefin, and carbon dioxide; at a reaction temperature sufficient to (1) decompose said urethane into said amine, isoolefin and carbon dioxide, and (2) volatilize said isoolefin. A preferred temperature is below a temperature which detrimentally alters any ingredient in the expandable composition which is to be present in the finished foam.

The expansion of a plastic composition according to the process of this invention can be carried out by two general methods. The first is a pressure method and involves two steps:

(A) decomposing a urethane of a monohydric alcohol in one vessel, and charging the blowing gas thereby produced into an expandable composition in another vessel under pressure; and (B) releasing the pressure on the expandable composition, thereby causing the blowing gas charged therein to expand and foam the expandable composition.

This method can be employed to prepare a foam which does not contain the amine produced upon decomposition of the urethane. Frequently it is desirable to exclude the amine from the foamed product to avoid an offensive odor. If the amine produced upon decomposition of the urethane is sufficiently volatile to be within the gases and vapors, it can be removed by scrubbing the gases and vapors with an acid, prior to charging the blowing gas into the expandable composition.

Since the urethane is decomposed in a separate reaction vessel, this method is suitable for the preparation of a blowing gas from a urethane which has a higher decomposition temperature than the ingredients in the expandable composition. This is another advantage of the pressure method.

The superatmospheric gas pressure employed in this pressure method is not critical. Pressures within the range of from about 50 to about 5000 p.s.i. can be employed. A preferred pressure range is from about 500 to about 3000 p.s.i. A most preferred pressure range is from 1000 to 2000 p.s.i.

The second general method for carrying out the process of this invention comprises the decomposition of a urethane incorporated within an expandable composition. Since this embodiment generates the blowing gas in the plastic mixture to be expanded, a separate decomposition vessel is not required. Therefore, a preferred embodiment of this invention for the preparation of a cellular plastic composition comprises generating a blowing gas in an expandable composition containing a urethane of a tertiary alcohol, by heating the expandable composition-urethane mixture, to a reaction temperature above the decomposition temperature of the urethane, thereby decomposing the urethane into an amine and a blowing gas mixture comprising carbon dioxide and an isoolefin.

In other words, a preferred embodiment of this invention comprises heating an expandable plastic-urethane mixture at a reaction temperature sufficient to (1) decompose the urethane into an amine, carbon dioxide, and an isoolefin, and (2) volatilize the isoolefin.

This embodiment is especially suited for the preparation of foams having a matrix containing a polyvinyl halide. Hence, a preferred method of this invention is a process for the preparation of a cellular plastic product, said process comprising:

Heating an expandable plastic composition comprising
(A) a polyvinyl halide, and
(B) a monomeric urethane of a monohydric saturated tertiary alcohol; said alcohol having from 4 to about 8 carbon atoms, and being free of active hydrogens other than the hydrogen in the hydroxy radical of said alcohol; said urethane having a decomposition temperature lower than the fusion temperature of said polyvinyl halide, whereby, at said decomposition temperature, said urethane decomposes into an amine, an isoolefin, and carbon dioxide, at a reaction temperature sufficient to
(1) decompose said urethane into said amine, isoolefin and carbon dioxide, and
(2) volatilize said isoolefin, said reaction temperature being lower than said fusion temperature of said polyvinyl halide.

To produce the blowing gas within the expandable composition (by the second general method discussed above) it is not necessary to add a preformed urethane to the mixture to be expanded. The urethane can be produced in the frothable composition by the reaction of an isocyanate with a tertiary alcohol. This embodiment is especially preferred when preparing a foam containing a polyvinyl halide, since the isocyanate and the alcohol plasticize the polyvinyl halide and yield a workable plastisol with much less plasticizer than otherwise would be required. Hence, a preferred embodiment of this invention comprises (A) forming a primary plastic composition containing a monomeric urethane; said urethane having a decomposition temperature below the fusion temperature of said polyvinyl halide, whereat said urethane decomposes into an amine, carbon dioxide, and an isoolefin, said isoolefin having a boiling point below said fusion temperature; by reacting an organic isocyanate with a saturated monohydric tertiary alcohol in the presence of said polyvinyl halide and a plasticizer for said polyvinyl halide; said isocyanate having from about 6 to about 19 carbon atoms and at least one reactive isocyanate group, said alcohol having from 4 to about 8 carbon atoms and being free of active hydrogens other than the hydrogen in the hydroxyl radical of said alcohol;

(B) heating said primary composition thereby produced at a reaction temperature sufficient to (1) decompose said urethane into said amine and a blowing gas comprising said carbon dioxide and a vapor of said isoolefin, and (2) concurrently react said amine with an additional quantity of said isocyanate to form a substituted urea-containing polyvinyl halide composition, said reaction temperature being below the fusion temperature of said polyvinyl halide; whereby said blowing gas expands said urea-containing composition forming a cellular intermediate; and (C) heating said cellular intermediate thereby produced at a temperature sufficient to fuse said polyvinyl halide, thereby forming said cellular reaction product.

As mentioned above, the amine produced by the decomposition of a tertiary alcohol can be reacted within an expandable composition. Preferably, the amine is reacted with an ingredient in the expandable composition to form a substance which improves the visco-elastic state and gas-retentive properties of the expandable composition.

A convenient method for utilizing the amine to improve the gas-retentive properties of the expandable composition comprises reacting the amine with an isocyanate. The product of the reaction is a urea. The urea increases the viscosity of the expandable composition, thereby improving its gas-retentive properties.

A preferred embodiment comprises the formation of a polyurea. It has been found that, in many instances, superior foams are produced when the expandable composition contains a polymer of this type. Polyureas are prepared by reacting an isocyanate having more than one reactive isocyanate group with a polyamine. The polyamine is produced by decomposition of a urethane prepared by the reaction of two or more isocyanate groups in a polyisocyanate with an alcohol. Urethanes and amines of this type are illustrated by the products of Equations B and C respectively. As illustrated by Equation B, urethanes of this type have at least two tertiary alcohol-esterified carbamato linkages

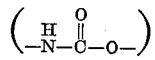

bonded to an organic nucleus.

Hence, a preferred embodiment of this invention comprises a process for the preparation of polyurea-containing, cellular reaction product; said process comprising heating an expandable composition comprising a polyisocyanate and a monomeric urethane having at least two monohydric tertiary alcohol-esterified carbamate groups, said alcohol having from four to about eight carbon atoms; at a reaction temperature sufficient to (1) decompose said urethane into the corresponding polyamide, carbon dioxide, and the corresponding diolefin,
(2) volatilize said isoolefin, and
(3) react said polyamine with said polyisocyanate to form said polyurea.

When a diamine is reacted with a diisocyanate, a linear polyurea is formed. If either or both of the polyamine or polyisocyanate contain three or more reactive groups, a crosslinked polymer can be prepared. In some instances (especially when the mixture to be foamed contains a polyvinyl halide) crosslinked polyureas are less compatible with the other ingredients than linear polyureas, and yield more friable foams. Consequently, when friability is not desired, the reaction of a diisocyanate and a diamine (derived from a urethane having two esterified carbamato linkages) is preferred.

Any urethane which is decomposable at a comparatively low temperature into an amine and a blowing gas mixture comprising carbon dioxide and an isoolefin vapor, can be employed in this invention. Preferred urethanes are decomposable at a temperature below about 180° C. Urethanes of this type are preferred since they can be decomposed in the presence of many foamible reaction mixtures with out destroying or detrimentally altering any of the other ingredients of the mixture which are to be present in the finished foam. Urethanes of tertiary alcohols can be decomposed below about 180° C.; therefore, they are preferred. Urethanes of primary and secondary alcohols decompose at much higher temperatures; therefore, only the pressure method described above can be used to generate a blowing gas from these compounds. Hence urethanes of primary and secondary alcohols are not preferred.

To be applicable, a urethane of a tertiary alcohol need not generate an isoolefin which is in the vapor state at the decomposition temperature of the urethane. All that is required is that the isoolefin have an appreciable vapor pressure (preferably a boiling point) below a temperature which will detrimentally alter any of the other ingredients within the expandable composition. For example, when the process of this invention is employed to expand a frothable composition containing a polyvinyl halide, it is preferred that the isoolefin have a boiling point below the decomposition temperature of the polyvinyl halide.

In general, the isoolefin produced by the decomposition of a urethane of a monohydric tertiary alcohol having from 4 to about 8 carbon atoms has the requisite volatility characteristics. In order to insure the preparation of an isoolefin vapor under the required temperature conditions, preferred urethanes are derived from monohydric tertiary alcohols which are free of substituents that are reactable with any of the ingredients within the expandable composition. Thus, for example, since the process of this invention is admirably suited for expanding a frothable composition containing an isocyanate, the isoolefin generated must be free from isocyanate reactive (active) hydrogens. In other words, the monohydric tertiary alcohol from which the urethane blowing agent is produced must be free from active hydrogens other than the hydrogen within the hydroxy radical of the alcohol.

The blowing agents employed in the instant process have the formula

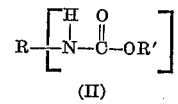

wherein R is a stable inert organic radical or an isocyanate substituted organic radical having from about 6 to about 13 carbon atoms; R' is an inert tertiary organic radical, free from isocyanate reactive (active) hydrogens and having from 4 to about 10 carbon atoms; and $a$ is an integer having a value of one to about three. A urethane of this type is the diurethane (I) in Equation C above.

As mentioned and illustrated above, the blowing agents employed in this process can be prepared by the reaction of an alcohol and an isocyanate. Therefore, the blowing agents of Formula (II) above can be best described by a consideration of the alcohols and isocyanates from which they can be derived. Preferred alcohols and isocyanates are discussed below. Immediately thereafter, examples of preferred urethane blowing agents are listed and illustrated.

The monohydric tertiary alcohols which form the preferred urethane blowing agents applicable in this invention have from 4 to about 8 carbon atoms and only one isocyanate reactive site; namely, a hydroxy radical bonded to a carbon atom that is bonded to three other carbon atoms. In other words, the hydroxy group is bonded to a tertiary organic radical. Alcohols of this type have the characteristic structure illustrated in Formula III.

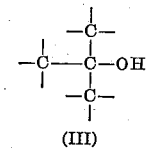

The carbon atoms that have the unsatisfied valences in Formula (III) are bonded to isocyanate inert organic radicals or hydrogen atoms so that the valences are satisfied. For example, when each of the carbon atoms in Formula (III) (which are not bonded to the hydroxy group) are bonded to three hydrogen atoms, the compound is tert-butanol. That compound is preferred because of its availability.

Substitution of one of the methyl hydrogens of tert-butanol yields an amyl alcohol. The tertiary amyl alcohols are applicable in the process of this invention. Similarly, the tertiary hexanols afforded by substitution of two methyl hydrogens of tert-butanol with methyl radicals or one hydrogen with an ethyl radical are applicable. Other applicable alcohols are the tertiary heptanols afforded by substituting tert-butanol with three methyl radicals, or with a methyl and ethyl radical or with a propyl radical (either n-propyl or isopropyl). Similarly, tertiary octanols derived from tert-butanol by substitution with four methyl groups, two methyl and one ethyl radicals, one methyl and an isopropyl or n-propyl radical, or a n-butyl, sec-butyl, isobutyl, or tert-butyl radical are applicable.

Thus, a class of monohydric tertiary alcohols which is applicable in this invention includes tert-butanol and derivatives thereof wherein one or more of the methyl hydrogens in that compound are substituted by univalent organic radicals. Preferred compounds of this class have the formula:

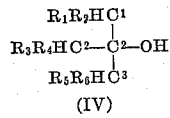

(IV)

wherein $R_1$, $R_3$ and $R_5$ are independently selected from the class consisting of hydrogen and alkyl radicals having one to four carbon atoms; $R_2$, $R_4$ and $R_6$ are independently selected from the class consisting of hydrogen, fluorine and chlorine atoms, and alkyl radicals having one to four carbon atoms; such that the number of carbon atoms within the molecule does not exceed about eight and a total of at least five hydrogen atoms are bonded to carbon atoms $C^1$, $C^2$, and $C^3$.

Illustrative but non-limiting examples of alcohols of this type are listed below.

*Tertiary butanols.*—Tert-butanol, 1-fluoromethyl-(1-methyl)ethanol, 1,1-di(fluoromethyl)ethanol, 1,1-di(fluoromethyl)-2-fluoroethanol

*Tertiary pentanols.*—1,1-dimethylpropanol 1-fluoromethyl-1-methylpentanol

*Tertiary hexanols.*—1,1-dimethylbutanol, 3 - methylpentan-3-ol, 2-fluoro-3-methylpentan-3-ol

*Tertiary heptanols.*—2-ethylpentan-2-ol, 2,3 - dimethylpentan-3-ol, 1-methyl-(1-ethyl)butanol, 1 - fluoro-(1-ethyl)pentan-2-ol

*Tertiary octanols.*—Di(isopropyl)methylcarbinol, 2,2 - diethyl-1-butanol, 1,1,3,3 - tetramethylbutanol, 1,3 - dimethyl-3-hexanol Another type of preferred monohydric alcohols is the tertiary alicyclic alcohols. These compounds contain a hydroxy radical bonded to a carbon atom within a non-aromatic ring which is also bonded to an exocyclic organic radical. Alcohols of this type can be considered to be derivatives of the alcohols illustrated by Formula IV above when, for example, $R_1$ and $R_3$ are replaced with a divalent organic radical which bridges carbon atoms $C^1$ and $C^3$.

A preferred class of alicyclic alcohols have the formula

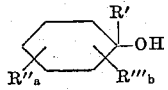

wherein R' is an alkyl radical having from one to three carbon atoms; R'' is an alkyl radical having from one to two carbon atoms; R''' is a fluorine radical or a methyl radical; *a* and *b* are integers having a value of zero to two, such that the total number of carbon and fluorine atoms does not exceed about nine.

Illustrative but non-limiting examples of alcohols of this type are 1-methylcyclohexanol, 1-ethylcyclohexanol, 1-n-propylcyclohexanol, 1-isopropylcyclohexanol, 1-2-dimethylcyclohexanol, 1,3-dimethylcyclohexanol, 1,4 - dimethylcyclohexanol, 3-ethyl-1 - methylcyclohexanol, 4-ethyl-1-methylcyclohexanol, 3,5-difluoro-1 - methylcyclohexanol, 4-fluoro-1-ethylcyclohexanol, and the like.

As mentioned above, the process of this invention comprises the decomposition of a urethane derived from a monohydric tertiary alcohol and an organic isocyanate. Both mono and polyisocyanates are applicable. When the process of this invention is used to foam a reaction mixture containing a polyhydric alcohol and a polyisocyanate to form a polyurethane, the same polyisocyanates used to form the polyurethane can be employed to form the non-polymerizable monomeric urethane blowing agents. In other words, urethanes derived from polyisocyanates (and monohydric tertiary alcohols) are preferentially employed to expand mixtures which yield polyurethanes.

Applicable isocyanates have the formula:

wherein $R^a$ is an organic radical and $x$ is an integer having a value of one to about three. Preferably, $R^a$ is a hydrocarbon radical having about six to about 13 carbon atoms. When $x=1$, $R^a$ is a univalent radical, and when $x=2$, $R^a$ is a divalent radical such as an alkylene or arylene radical. Diisocyanates containing other divalent radicals such as

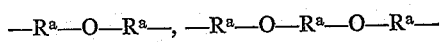

and the like are applicable but are not preferred since they are not as readily obtainable as isocyanates which contain divalent hydrocarbon radicals. Applicable isocyanates include n-hexylisocyanate, phenylisocyanate, 2-naphthylisocyanate, hexamethylene diisocyanate, toluene 2,4-diisocyanate, toluene-2,6-diisocyanate, the xylylene diisocyanates, naphthalene-1,5-diisocyanate, triphenylmethane-4,4'4''-triisocyanate, diphenylmethane-4,4' - diisocyanate, and the like. Methoxy, halogen and nitrosubstituted arylisocyanates such as anisylisocyanate, p-chlorophenyl isocyanate, 3,5-dinitrophenylisocyanate, and the like, can be employed if desired.

Mixtures of isocyanates of the type described and illustrated above can be employed if desired. A preferred mixture is toluene-2,4-diisocyanate and toluene-2,6-diisocyanate. Most preferably, these compounds are present in an approximately 80 percent-20 percent mixture (80 percent toluene-2,4-diisocyanate).

A preferred embodiment of this invention is the use of a mixture of blowing agents which comprises the monourethane derived by reacting one isocyanate radical of a diisocyanate with a monohydric tertiary alcohol, and the diurethane obtained by reacting both isocyanate radicals of the diisocyanate with the alcohol. A typical mixture of this type contains the two compounds illustrated below which are urethanes derived from toluene-2,4-diisocyanate and 1-methylcyclohexanol.

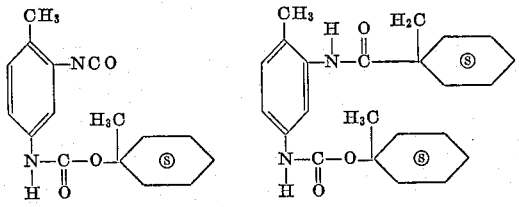

In general, the decomposition temperature of an monourethane differs from the decomposition temperature of a diurethane. Hence, use of a mixture thereof provides a smooth evolution of expanding gas over a wide temperature range.

Other mixtures containing more than two urethanes can be employed if desired. For example, reaction of a mixture of diisocyanates such as an 80%–20% mixture of isomeric toluene diisocyanates with an applicable alcohol can afford the preparation of two diurethanes and four monourethanes. Urethane mixtures can also be prepared by adding many preformed urethanes as desired to the reaction mixture.

Illustrative but non-limiting examples of urethanes derived from monohydric tertiary alcohols which can be employed in the process of this invention are: tert-butyl 3-isocyanato-2-methylcarbanilate, tert-butyl 3- isocyanato-5-methylcarbanilate, di-tert-butyl (4-methyl-m-phenylene)dicarbanilate, di - tert - butyl (2-methyl-m-phenylene)dicarbanilate, 1-methylcyclohexyl 3-isocyanato-2-methylcarbanilate, 1-methylcyclohexyl 3-isocyanato-5-methylcarbanilate, di-1-methylcyclohexyl (4-methyl-m-phenylene) dicarbanilate, di-1-methylcyclohexyl (2-methyl-m-phenylene)dicarbanilate, tert-butyl-3-isocyanato-2,4-dimethylcarbanilate,

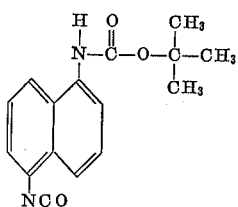

tert-butyl-5-isocyanato-1-naphthalenecarbamate,

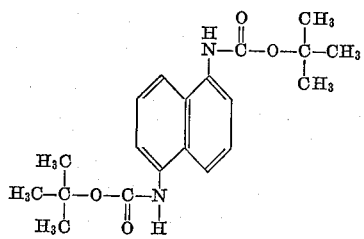

di-tert-butyl 1,5-naphthalenedicarbamate

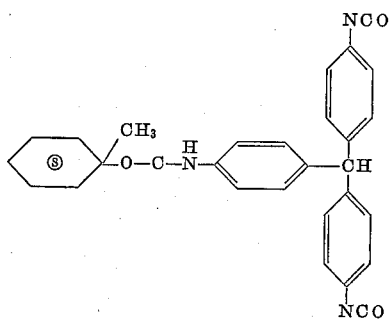

1 - methylcyclohexyl p-[bis(p-isocyanatophenyl)methyl] carbanilate,

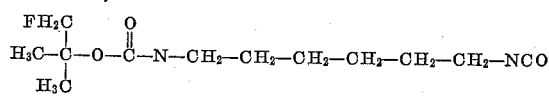

1 - fluoromethyl-1-methylethyl (6-isocyanato-n-hexyl)carbamate, and the like.

A highly preferred embodiment of this invention comprises the decomposition of a urethane derived from a tertiary alcohol containing fluorine radicals. Urethanes of this type are ilustrated by the blowing agent immediately above. Other urethanes of this type can be derived from the fluorinated alcohols such as 3,5-difluoro-1-ethylcyclohexanol, 4-fluoro-1-methylcyclohexanol, and the like. When decomposed according to the process of this invention, these urethanes yield fluorinated isoolefins. Isoolefins of this type (when entrapped in the closed cells of the finished foam) markedly improve the terminal conductivity characteristics of the finished foams. Foams of this type are especially suitable in the construction of insulating walls.

Another highly preferred embodiment of this invention comprises the preparation of a foam by the generation of a blowing gas containing an isoolefin which is liquid at ambient temperatures. Upon cooling the foams produced by expansion with isoolefins of this type, the isoolefin within the closed cells condenses and causes a partial vacuum within the cells. The vacuum causes the cell walls to wrinkle. The wrinkled cell walls increase the mechanical strength of the foams.

The process of this invention can be employed to expand a wide variety of plastic compositions. The expandable compositions may be in a liquid or semi-liquid state or may be in a solid state; for example, in a sheet. Expandable plastic sheets are known in the art and can be prepared by compressing a solid or semisolid mixture of a polymer, a plasticizer, and (if desired) other ingredients. To expand a plastic sheet according to the process of this invention, a sheet containiig a urethane of a tertiary alcohol is prepared. Thereafter, the sheet is heated (either in or outside of a mold) until the sheet begins to flow and the blowing agent is decomposed. The release of the blowing gas upon decomposition of the blowing agent yields a plastic foam.

The process of this invention for the production of foams can be applied to any substance having the viscosity and elasticity necessary to produce a foam. This process is admirably suited to the production of foams from synthetic plastic materials having a visco-elastic state (in a plasticized or unplasticized condition). Applicable synthetic materials include alkyd resins, urea-formaldehyde resins, polymerized unsaturated substances such as polyacrylonitrile and polystyrene, polyvinyl resins such as polyvinyl chloride and polyvinyl acetate, copolymers of polyvinyl chloride and polyvinyl acetate, and non-resinous substances such as ethyl cellulose, cellulose acetate and the like. The foamable materials may be thermoplastic on thermosetting or can be substances which polymerize during the course of the process. This process is well suited to a system comprising polyurethane precursors which polymerize to form polyurethanes. Moreover, this process can be employed to form cellular plastic materials from a reaction medium which comprises a mixture of two or more of the applicable materials illustrated above.

Plastisols are effectively blown by this process. Plastisols are pasty mixtures of unplasticized resin with a plasticizer which is a liquid that does not dissolve the resin particles to an appreciable extent at ordinary temperatures.

A preferred foam of this invention is a fused reaction product of a mixture comprising a polyvinyl halide type resin and (per 100 parts of polyvinyl halide-containing resin):
between about 15 to about 75 parts of plasticizer;
between about 5 to about 35 parts of an inert organic liquid having a boiling point within the range of from about 15 to about 150° C.;
between about 3 to about 50 parts of an alcohol selected from the class consisting of polyhydric primary and secondary alcohols;
between about 2 to about 6 parts of a heat stabilizer for a polyvinyl halide;
between about 2 to about 6 parts of a foam stabilizer;
between about 18 to about 70 parts of an organic polyisocyanate of the type described above; and
between about 17 to about 25 parts of a monohydric tertiary alcohol of the type described above.

Highly preferred foams of this type have between about 20 to about 45 parts of an organic polyisocyanate, preferably 25 to 30 parts. Furthermore, the most preferred foams contain from about 8 to about 20 parts of monohydric tertiary alcohol, and most preferably from about 8 to about 17 parts.

The polyvinyl halides, plasticizers, inert organic liquids, polyhydric alcohols, and foam stabilizers employed in this embodiment of the invention are described and illustrated below.

Any polyvinyl halide resin known in the art can be incorporated in these foams. Applicable resins include homopolymers, copolymers, and mixtures of polymers. Illustrative and non-limiting examples of applicable polyvinyl halide resins are:

(1) *Homopolymers.*—Polyvinyl chloride, polyvinyl bromide, polyvinyl fluoride, polyvinylidene chloride, polydichlorostyrene and the like, (2) *Copolymers.* — Vinylchloride-vinyl acetate, vinylchloride-vinyl alcohol, vinylchloride-vinylidene chloride, vinylchloride-diethyl maleate, vinyl chloride esters of unsaturated alcohols and unsaturated acids and the like, and (3) *Mixtures.*—Polyvinyl chloride and polydichlorostyrene, polyvinyl chloride and vinyl acetate-vinyl chloride polymer, polyvinyl chloride, polyvinylidene chloride, and a copolymer of vinylchloride-diethylmaleate and the like.

In the highly preferred foams of this invention, the polyvinyl halide is present in from about 50 to about 70 percent by weight. Preferably about 70 to 100 percent by weight of the polyvinyl halide is a homopolymer of the type illustrated above. Preferred homopolymers have a minimum molecular weight of about 25,000. The preferred homopolymer is polyvinyl chloride.

The polyvinyl halide-polyurethane foams of this invention are conveniently prepared from plastisols. The nature of the plasticizer employed to prepare the plastisol is not critical. Illustrative but non-limiting examples of applicable plasticizers are chlorinated paraffins, aromatic hydrocarbon oils, polyesters, fatty acid esters, partially epoxidized vegetable oils, and the like.

Applicable ester plasticizers include monoesters, diesters, triesters, tetraesters and higher esters. Monoester plasticizers which can be used in the process of this invention include methyl Cellosolve laurate, n-butyl palmitate, n-butyl stearate, tetrahydrofurfuryl oleate, and the like.

Illustrative and non-limiting examples of applicable diester plasticizers are di-n-hexyl phthalate, diisooctylphthalate, di-(2-ethylhexyl) phthalate, n-butyl (cyclohexyl) phthalate, di-(1,3-dimethylbutyl) adipate, dinonyl adipate, di-(2-ethylhexyl) azelate, diethyleneglycol pelargonate, and the like.

Typical triesters which can be employed in this invention include glyceryl tributyrate, tri-n-butyl citrate and the like. Applicable tetra and higher esters include acetylated castor oil, n-butyl-acetyl polyrecinoleate, and the like.

Ethers which may be employed as plasticizers in the instant invention include bis(dimethylbenzyl) ether and propylene glycol mono-n-butylether, and the like.

Other applicable plasticizers include toluene sulfonamides, and primary $C_8$, $C_{10}$, and $C_{12}$ nitriles.

Many of the polyvinyl halide-containing foams having a high percentage of polyvinyl halide, provided by this invention, are flame retardant; hence, a flame-proofing plasticizer need not be incorporated in these foams. If the process of this invention is employed to expand a foam which does not have inherent flame-retardant properties, a flame-proofing, non-combustible plasticizer may be desired. Applicable plasticizers of this type are the phosphates such as tricresyl phosphate and tris(dichloropropyl) phosphate.

In the preferred polyurethane-polyvinyl halide foams of this invention from about 15 to about 75 parts of plasticizer are used per 100 parts of resin, usually 28 to about 35 parts. Highly preferred foams contain from about 32 to about 34 parts of plasticizer per 100 parts of resin.

As mentioned above, the foams produced by the process of this invention can be expanded by the gases and vapors produced by the decomposition of a urethane derived from a monohydric tertiary alcohol and by the vapors produced by evaporation of a low-boiling liquid. In this embodiment, a low boiling liquid is incorporated in the reaction mixture.

Any liquid which does not react with the other ingredients in the mixture to be foamed to give a non-volatile product, and which is readily evaporated under the process conditions employed, can be used in this embodiment. The preferred liquids have a boiling point between about 15° C. and the fusion temperature of the mixture. Highly preferred lqiuids have a boiling point between about 15° and about 150° C. The most preferred liquids have a boiling point between about 25° and about 85° C.

The nature of the liquid is not critical and many types of organic liquids such as hydrocarbons, halogenated hydrocarbons, ketones, ethers and the like can be employed. Typical applicable hydrocarbons are the paraffins, either straight or branched chain, having from about 5 to about 9 carbon atoms such as n-pentane, iso-pentane, neopentane, n-octane, isooctane, n-nonane, and the like. Applicable halogenated hydrocarbons include the halogen derivatives of the paraffins having from one to about 9 carbon atoms which have the requisite stability and volatility. Preferred compounds are derivatives of fluorine and chlorine. Typical applicable fluorinated hydrocarbons are methylene chloride, chloroform, trichlorofluoromethane, 1,2-difluorotetrachloroethane, and the like. Typical ethers which have the requisite boiling point and stability are diethylether, diisopropylether, methyl n-butylether, di(chloromethyl) ether, tetrahydrofuran, and the like. Ketones which are applicable include acetones, methylethyl ketone, diethylketone, penacolone, chloroacetone, cyclohexanone, and the like.

Mixtures of liquids that can be employed: for example, mixtures of two, three, or more liquids are applicable. In some cases mixtures are preferred, especially when a steady evolution of vapor over a wide temperature range is desired. A typical mixture is trichlorofluoromethane and methyl ethyl ketone. Usually, about 5 to about 35 parts, preferably 10 to 30, and most preferably 15 to 25 parts of inorganic liquid per each 100 parts of polyvinyl halide are employed.

Polyurethane-containing foams produced by the process of this invention, including the novel polyvinyl halide-polyurethane foams provided herein, are prepared from reaction mixtures which contain a polyhydric alcohol; i.e., an alcohol containing two or more hydroxyl groups. Applicable polyhydric alcohols include the glycols such as ethylene and propylene glycol; glycerol; glycosides of tetroses, hexoses, and pentoses; sorbitol, mannitol, trimethylolpropane, N,N,N'N' - tetrakis-(2-hydroxypropyl) ethylene-diamine (Quadrol) pentaerythritol; the alkylene oxide derivatives or sorbitol and pentaerythritol (Pluracols), and the like.

Polyhydric alcohols having a molecular weight of from about 80 to about 580 are preferred since they react rapidly with polyisocyanates at low temperatures and produce a comparatively high temperature increment. The heat evolved aids in the evaporation of the non-reactive organic liquid blowing agent (if present) and also supplies at least some of the heat necessary to decompose the urethane blowing agents. Hence, use of these low molecular weight alcohols tend to aid the expansion of the reaction mixture. Preferred polyhydric alcohols of this type are Quadrol, triethanolamine, trimethylolpropane, Pluracol PeP–450 and Pluracol SP–560. The latter two compounds are propylene oxide derivatives of pentaerythritol and sorbitol respectively which are sold by Wyandotte Chemicals Corporation.

Higher molecular weight alcohols, preferably from about 1250 to about 2800 are also preferred. These alcohols yield foams having excellent mechanical strength.

Liquid alcohols of this type are efficaciously employed when the process of this invention is used to prepare one of the novel polyvinyl halide-polyurethane foams provided herein. Liquid high molecular weight polyhydric alcohols plasticize the polyvinyl halide to some extent.

The plasticizing action of these alcohols is greatly diminished when the alcohols have reacted with a polyisocyanate to form a polymer (e.g., a polyurethane). Hence, these alcohols are "temporary" plasticizers. Therefore, the amount of plasticizer present in the finished foam is less than the amount present in the reaction mixture. The reduction of amount of plasticizer affords a more rigid foam.

Important benefits can be gained by taking advantage of the temporary plasticizer action of the higher molecular weight polyols. For example, less plasticizer is needed to prepare the plastisol; hence there is a savings in cost. Moreover, plastisols with optimum workability can be prepared which yield more rigid foams than heretofore obtainable. As appreciated by a skilled practitioner, many plastisols known in the art having optimum processing characteristics do not yield foams having the desired rigidity.

Examples of applicable high molecular weight alcohols which are advantageously employed in the process include Pluracol TP 1540 and Pluracol TP 2540 which are propylene oxide derivatives of trimethylolpropane having molecular weights of 1540 and 2540 respectively.

In many instances, a mixture of a high molecular weight polyol and a low-molecular weight polyol are advantageously employed. Such a mixture combines to some extent the best features of both types of alcohols. For example, the low-molecular weight alcohols afford a comparatively high evolution of heat and a polyurethane which is more compatible with a polyvinyl halide, while the high molecular weight polyols offer the benefits discussed above.

In general, from about 3 to about 50 parts of a polyhydric alcohol per 100 parts of resin are used when preparing a novel polyvinyl halide-polyurethane foam of this invention. Preferably from 4 to 7 parts and most preferably from about 5 to about 7 parts are used.

Usually about chemically equivalent quantities of alcohol and isocyanate are employed. When a monohydric tertiary alcohol (in contrast to a preformed urethane derived therefrom) is employed, the amount of polyol is correspondingly reduced or the amount of isocyanate correspondingly increased in order to maintain a substantially equivalent quantity of isocyanate and the substances reactable therewith.

Another component which can be employed in the reactive mixtures expanded by the instant process (an included in the preferred foams of this invention) is a heat stabilizing agent for the polyvinyl halide. Examples of such heat stabilizing agents are lead compounds such as lead silicate, lead titanate, basic lead carbonate, lead stearate, and the like; bismuth oxides; soaps, such as calcium stearate, barium ricinoleate; organic compounds such as the epoxy esters, for instance epoxidized soy bean oil; and water insoluble organic amines. Mixtures of two or more of these stabilizing agents can be employed if desired. The amount of heat stabilizer will vary widely since, as discussed above, some of them also function as a plasticizer. Usually, between 2 to 6 parts, preferably 2.5 to 5 parts, of a heat stabilizer lacking plasticizing action is used for each 100 parts of polyvinyl halide resin.

A foam stabilizer is employed when preparing the preferred polyurethane-polyvinyl halide foams of this invention. Any foam stabilizer known in the art which is compatible with the other ingredients in the expandable composition is applicable. Silicon polymers are the preferred foam stabilizers. In general, the amount of foam stabilizer employed is from about 2 to about 6 parts per 100 parts of polyvinyl halide; preferably 3 to 4 parts.

In many instances, the polyhydric alcohol and polyisocyanate interact readily upon being intermixed. In instances where the reaction is sluggish, catalysts can be added to the expandable composition to accelerate the reaction. Suitable catalysts are basic substances including the strong inorganic bases such as sodium hydroxide and the like. Highly preferred basic catalysts are the organic bases such as N-methylmorpholine and triethylamine. Usually 0.2 to 0.6 part of catalyst per 100 parts of resin are employed.

Other ingredients can be added to the expandable composition. Examples of other ingredients include organic fillers such as calcium carbonate, charcoal, diatomaceous earth, aluminum silicates, and the like. Other ingredients which can be added if desired include dyes, antioxidants, fire-proofing agents, and the like.

Since water reacts with an isocayanate to yield much less blowing gas than a tertiary alcohol, it is preferred that the water content of the expandable compositions be kept to a minimum. In other words, it is preferred that this process be carried out under substantially anhydrous conditions. The absence of water is not critical. Hence, it is not necessary to remove any residual water present in any of the components of the expandable composition. In other words, sufficiently anhydrous conditions are realized without resorting to removel of the residual water from any of the ingredients. If desired, water can be added to the mixtures to be foamed in amounts as high as approximately 10 percent by weight. In many instances, the addition of water serves no useful purpose. Hence, the use of added water is not preferred.

As discussed above, one embodiment of this invention comprises the generation of a blowing gas in an expandable composition. It is not necessary for all of the blowing gas to be derived from the urethane blowing agents described above. In fact, in a preferred embodiment, a substantial portion of the blowing gas is generated by the reaction of a polyhydric alcohol with a polyisocyanate. Since the generation of gas by this reaction is initiated by contacting the isocyanate with a polyhydric alcohol, it is desirable to contact the isocyanate with the alcohol after all of the other desired ingredients are present within the reaction mixture.

When the process of this invention is employed to expand a polyurethane foam, the "one-shot," pre-polymer, and semi-pre-polymer methods common in the urethane art can be employed. These techniques are discussed on pages 224–231 of High Polymers, volume 16, Polyurethanes, Chemistry and Technology I Chemistry, Saunders and Frisch, Interscience Publishers, Inc., New York (1962). Embodiments employed to prepare polyvinyl halide containing foams are discussed below.

When the process of this invention is employed to prepare a polyvinyl halide-polyurethane foam from a plasticized polyvinyl halide composition, best results are obtained by adding all the liquid ingredients which plasticize the polyvinyl halide to the plastisol except for either the isocyanate reactive substances or the isocyanate. Thereafter, the isocyanate or the isocyanate reactive substances (whichever was excluded from the plastisol) is then added to the plastisol to form the expandable composition. Through this method, workable plasticizers are obtained and the generation of the gas from the reaction of a polyhydric alcohol and an isocyanate is not initiated until all the other desired ingredients are present in the reaction mixture.

After all of the ingredients have been mixed, the expansion of the resultant reaction mixture can be carried out by a free-rise or by a closed mold technique. When the free-rise technique is employed, the expandable composition is allowed to expand in an open container. As appreciated in the art, the geometry of the container markedly effects the shape of the finished foam. Thus, for example, if a cylinder whose height is comparatively larger than its diameter is used, a cylindrical cellular reaction product will be prepared. In contrast, if the expandable composition is spread in a comparatively thin layer over a wide surface area, a foamed sheet is produced.

When the free-rise technique is employed, two reaction steps are preferentially used. The first step comprises the preparation of an intermediate cellular product by the expansion of the expandable plastisol. The second step comprises heating the intermediate product above the fusion temperature of the polyvinyl halide to prepare a more homogeneous set cellular reaction product. Thus, the first step is carried out at a temperature below the fusion temperature of the polyvinyl halide. In some instances, the temperature required for full expansion is produced by the exothermic nature of the reactions of the isocyanate reactive substances with the isocyanate. If the heat evolved is not sufficient, external heat can be applied. To avoid fusion of the polyvinyl halide in this first step, the process is generally carried out at a temperature below about 180° C. In order to volatiize the inert low-boiling liquid, the process is preferentially carried out at a temperature above the boiling point of the liquid.

From the above it is clear that the preferred reaction temperature (for the first step) is between the boiling point of the low boiling liquid and the fusion temperature of the polyvinyl halide. Thus, a preferred temperature range is between about 15 to about 180° C. A more preferred range is between about 25–180° C., and a most preferred range is from about 50 to about 180° C. The fusion step must be carried out at a temperature above the fusion temperature of the polyvinyl halide. The exact temperature is not critical, and a temperature which does not decompose the polyvinyl halide or the other ingredients in the intermediate product is preferred. Thus, the fusion temperature is generally carried out at a temperature between about 150° and 220° C. A preferred temperature is from about 180° to about 190° C. Fusion is usually complete in less than one-half hour. In many instances, the finished product is obtained after a fusion period of less than about 20 minutes.

Instead of having merely two heating steps as described above, three or even more heating steps can be employed depending upon the character of the cellular mass being foamed and the properties desired in the finished cellular reaction product. Due to the poor heat transmission within solids of this type, a succession of heating steps may yield a product of superior quality. The succession of heating steps allows the temperature of the interior of the reaction mass to reach the desired temperature without exposing the exterior to excessive heat for too long a period.

As mentioned above, the instant process can be carried out using a closed mold technique. In contrast to the free-rise method which usually yields a large number of open cells, the closed mold technique usually affords a predominant number of closed cells. In the latter method, the expandable composition is placed in a mold and a pressure impressed thereon which is sufficient to keep the mass in the mold. As appreciated in the art, the impressed mechanical pressure will vary according to the geometry of the mold and the relative volumes of the expandable composition and the mold. Usually pressures within the range of 500 to 40,000 p.s.i. are employed. A preferred range is from 10,000 to about 25,000 p.s.i.

Release of the blowing gas within the expandable composition in a mold prepares an embryonic foam which further expands upon decrease of the pressure. In many instances, further expansion can be effected by heating the intermediate after it has been removed from the mold. In the closed mold technique, the reaction mass to be expanded is heated above the fusion temperature of the polyvinyl halide.

The free-rise or closed mold processes described above can be modified to further expand the reaction mass. For example, a cellular intermediate prepared by either technique can be exposed to vapors which cause the formation of additional blowing gas which further expands the intermediate. One method of carrying out this embodiment comprises formation of a cellular intermediate having unreacted isocyanate. After the intermediate is prepared, it is exposed to water vapor. The water vapor reacts with the isocyanate to form carbon dioxide which further expands the reaction mass. This technique is discussed in U.S. 2,576,749. To further expand an intermediate prepared by the free-rise process, it is preferred that this technique be employed prior to fusion.

Both the free-rise and closed mold technique can be automated through the use of a polyurethane foam machine. As appreciated in the art, machines of this type comprise means for metering an isocyanate and other ingredients to form a foamable reaction mixture, and means for discharging the foamable mixture into the vessels used for foaming.

The following examples further illustrate the process of this invention. All parts are by weight unless otherwise indicated. In the following examples, the polyvinyl halide employed was a dispersion grade polyvinyl halide readily obtainable on the market. Examples of polyvinyl halides of this type include Geon-121 (General Electric Co.), Marvinol–3001 (Naugatuck Division, U.S. Rubber Co.), Vinylite QYNV (Bakelite Corp.), and the like.

EXAMPLE 1

A plastisol having the following composition was prepared:

| | Parts |
|---|---|
| Polyvinyl chloride | 60 |
| Epoxidized soy bean oil | 20 |
| Pluracol PeP–450, a poly(oxypropylene) adduct of pentaerythritol having a molecular weight of 450, supplied by Wyandotte Chemical Corp. | 3 |
| A prior art silicone foam stabilizer sold under the trade name Silicone L–520 by Union Carbide Corp. | 2 |
| A prior art barium-cadmium polyvinyl heat stabilizer sold under the name "Mark–M" by Argus Chemical Corp. | 2.5 |
| A prior art tin catalyst sold under the trade name "T–12" by Metal Thermit Corp. | 0.2 |
| Trichlorofluoro methane | 10 |
| Tertiary butanol | 10 |

An isomeric mixture of toluene diisocyanates (15 parts) was added to the plastisol and the resultant expandable composition allowed to foam in an open container. After expansion was complete, the cellular product was then fused for ten minutes at 350° F. The set cellular fused product was a well-fused, semi-rigid foam having a density of 3.9 pounds per cubic foot and a polyvinyl chloride content of 53 percent.

EXAMPLE 2

A pastisol having the following composition was prepared:

| | Parts |
|---|---|
| Polyvinyl chloride | 60 |
| Epoxidized soy bean oil | 20 |
| Pluracol PeP–450 | 4 |
| Silicone L–520 | 2 |
| Mark–M | 2.5 |
| T–12 | 0.2 |
| Trichlorofluoro methane | 15 |
| Tert-butanol | 8 |

To the above plastisol, 15 parts of an isomeric mixture of toluene diisocyanate was added. The resultant expandable composition was poured into a closed mold and maintained at 350° F. for 15 minutes. Thereafter, the mold was cooled and opened. The set cellular reaction product was a very rigid, friable foam having a density of 4.4 pounds per cubic foot, and polyvinyl chloride content of 47 percent.

Similar results were obtained when the above reaction mixture was maintained for ten minutes in a closed mold at 350° F., cooled, and then removed from the mold.

EXAMPLES 3–14

The reaction mixtures tabulated in the following table are prepared by adding the isocyanate in the amount prescribed to a mixture of all the other indicated ingredients. The resultant mixture is then placed in a closed mold and the mold sealed by mechanical pressure. The expandable composition is then heated to a temperature of 350° F. for one-half hour. The contents are then cooled and the mold opened. The numbers to the right of the ingredient column indicate parts by weight. The density of the finished foam is indicated at the bottom of the table.

| Ingredient | Examples | | | | | | | | | | | |
|---|---|---|---|---|---|---|---|---|---|---|---|---|
| | 3 | 4 | 5 | 6 | 7 | 8 | 9 | 10 | 11 | 12 | 13 | 14 |
| Polyvinyl chloride | 100 | 100 | 100 | 100 | 100 | 100 | 100 | 100 | 100 | 100 | 100 | 100 |
| Dioctyl isophthalate | 36 | | | | | | | | | | | |
| Epoxidized soy bean oil | | 33 | 33 | | | | 75 | | 35 | | 20 | 20 |
| Texanol isobutyrate [1] | | | | 30 | | | | | | | | |
| Santoset-1 [2] | | | | | 50 | | | | 35 | 30 | | |
| Mark-M | 11 | 4.0 | 4.0 | | | 4.0 | 4.0 | | | | 5 | |
| Dibasic lead phosphate | | | | 4.0 | 4.0 | | | 4.0 | 4 | 4 | | 4 |
| DC-199 [3] | 3 | | | | | | | | | | | |
| Silicon oil L-520 [4] | | 3.3 | | | | 3.3 | 3.3 | 3.0 | | | 3.0 | |
| SF-1036 [5] | | | 4.1 | | 4.1 | | | | | | 3 | |
| XF-1066 [6] | | | | 4.0 | | | | | 3 | 3 | | 3 |
| Toluene 2,4-diisocyanate and toluene 2,6-diisocyanate (80/20 mixture)* | 25 | 25 | 25 | | | | | | | | | |
| Hexamethylene diisocyanate | | | | | | 30 | 30 | 30 | 25 | | | 25 |
| 2-naphthylisocyanate | | | | | 25 | | | | | 29 | | |
| Diphenylmethane-4,4'-diisocyanate | | | | | | | | | | | 43 | |
| Pluracol-PeP 450 [7] | 5 | 5 | 6.6 | 70 | | | | | | | | |
| Pluracol-TP 2540 [8] | | | | | 47 | | | | | 4.2 | 13.3 | 10 |
| Cyclohexanol | | | | | | 16.6 | 3 | | | | | |
| Methanol | | | | | | | | 5.2 | | 2.3 | 3.3 | |
| Isopropanol | | | | | | | | | | | 4 | 9.3 |
| Tertiary butanol | 25 | 16.6 | 13.3 | 25 | 16.6 | 25 | | 10 | 25 | | | |
| 1-methylcyclohexanol | | | | | | | | | | 10.4 | 8.3 | 5.6 |
| Isopentane | | | | | | | 38 | | | | | 6.9 |
| Trichlorofluoro methane | 10 | 16.6 | 25 | 33 | 33 | 33 | 20 | 35 | 20 | | 20 | 25 |
| T-12 | .4 | .4 | .4 | .4 | .4 | .4 | .4 | .4 | .4 | .4 | .4 | .4 |
| Vazo [9] | | | | | .2 | | | | | .2 | | |
| Density of foamed product (pounds per cubic foot) | 2.8 | 3.9 | 3.2 | 2.2 | 2.4 | 3.1 | 3.0 | 2.8 | 3.2 | 3.2 | 2.5 | 2.8 |

*The isomeric mixture of toluene diisocyanates employed in the above examples consists of 80% by weight toluene 2,4-diisocyanate and 20% by weight toluene 2,6-diisocyanate.

[1] An ester plasticizer for vinyl formulations, empirical formula $C_{16}H_{31}O_4$, theoretical molecular weight 286.4, ester content 98%, acid content, as isobutyric acid, 0.05%; saponification equivalence, 144.8; Texas-Eastman Company.

[2] A polymerizable plasticizer, acidity meq/100 gm. 0.1 max., refractive index at 25° C., 1.477–1.481, specific gravity 25/25° C., 1.050–1.055; Monsanto Chemical Company.

[3] A silicone polymer; Dow Corning Corporation.
[4] A silicone polymer; Union Carbide Corporation.
[5] A silicone polymer; General Electric Company.
[6] A silicone polymer; General Electric Company.
[7] Poly(oxypropylene) adduct of pentaerythritol, molecular weight, 450; Wyandotte Chemicals Corporation.
[8] A poly(oxypropylene) adduct of trimethylol propane, molecular weight, 2540; Wyandotte Chemicals Corporation.
[9] Azobis(isobutyryl nitrile).

Similar results are obtained when an equivalent amount of the corresponding preformed urethane is substituted for the monohydric tertiary alcohol and its stoichiometric equivalent of the isocyanate employed in the above examples. Similar results are obtained when an equivalent amount of trichlorotrifluoroethane is substituted for the trichlorofluoromethane employed in Examples 3–11 and 13–14. Similar foams are prepared when a chemically equivalent quantity of monofluoro tertiary butanol, difluorotertiary butanol, or trifluorotertiary butanol are substituted for the tertiary butanol employed in Examples 3–8 and 10–14.

Examples 3–6 and 2–14 illustrate the preparation of polyurethane polyvinyl chloride polyurea foams by the process of this invention. Examples 7–10 illustrate that the process of this invention is applicable to the preparation of polyvinyl chloride foams which do not contain a polyurethane. Examples 7 and 11 illustrate that this process can be employed in conjunction with the decomposition of solid blowing agents known in the art. The following example illustrates the applicability of this invention to the formation of a polyurethane foam.

EXAMPLE 15

The following reaction mixture is prepared:

| | Parts |
|---|---|
| Pluracol PeP 450 | 29 |
| Tertiary butanol | 18.5 |
| Cyclohexanol | 50 |
| Trichlorofluoro methane | 15 |
| T-12 | 3 |

Toluene diisocyanate, 87 parts, is added to the reaction mixture and the resultant expandable composition allowed to expand in an open container. After reaction is complete, the cellular intermediate is heated in a dry-air bath at 350° F. for about ten minutes. The product has a density of about 3 pounds per cubic foot.

The foams produced by the process of this invention, including the novel polyvinyl halide-polyurethane-polyamide foams, have the many diverse utilities which are known for plastic foams. For example, they are useful in the construction industry as decorative wall panels, both exterior and interior, roof deck material, and the like. They are also useful in the construction of theater marquees and as the foam interior of sandwich wall panels.

They are also useful in the construction of protective padding in the passenger and freight compartments of vehicles and in the production of protective clothing.

The novel polyvinylhalide-containing foams of this invention are much more flame-retardant than the polystyrene and polyurethane foams of the prior art. Moreover, those which also contain the vapor of a fluorinated isoolefin entrapped in the closed cells, are very good thermal insulators and are especially useful in the production of cold compartments such as refrigerators and cold storage rooms.

Having fully described the novel process of this invention, the products produced thereby, and their many utilities, it is desired that this invention be limited only by the lawful scope of the appended claims.

What is claimed is:

1. A process for the preparation of a cellular plastic product, said process comprising
heating an expandable plastic composition comprising a polyvinyl halide and a monomeric urethane of a monohydric saturated tertiary alcohol; said alcohol having from 4 to about 8 carbon atoms, and being free of active hydrogens other than the hydrogen in the hydroxy radical of said alcohol; said urethane having a decomposition temperature such that, at said decomposition temperature, said urethane decomposes into an amine, an isoolefin, and carbon dioxide; said heating being conducted at a reaction temperature sufficient to
(1) decompose said urethane into said amine, isoolefin and carbon dioxide, and
(2) volatilize said isoolefin.

2. A process for the preparation of a cellular plastic product, said process comprising heating an expandable plastic composition comprising
  (A) a polyvinyl halide, and
  (B) a monomeric urethane of a monohydric saturated tertiary alcohol; said alcohol having from 4 to about 8 carbon atoms, and being free of active hydrogens other than the hydrogen in the hydroxy radical of said alcohol; said urethane having a decomposition temperature lower than the fusion temperature of said polyvinyl halide, whereby, at said decomposition temperature, said urethane decomposes into an amine, an isoolefin, and carbon dioxide; and heating being conducted
    at a reaction temperature sufficient to
      (1) decompose said urethane into said amine, isoolefin, and carbon dioxide, and
      (2) volatilize said isoolefin,
    said reaction temperature being lower than said fusion temperature of said polyvinyl halide.

3. A process for expanding a plastic composition with carbon dioxide and an isoolefinic vapor, said process comprising
heating a primary expandable plastic composition comprising
  (A) a polyvinyl halide,
  (B) a polyvinyl halide heat stabilizer, and
  (C) a monomeric urethane of a monohydric saturated tertiary alcohol; said alcohol having from 4 to about 8 carbon atoms and being free of active hydrogens other than the hydrogen in the hydroxy radical of said alcohol; said urethane having a decomposition temperature lower than the fusion temperature of said polyvinyl halide, such that, at said decomposition temperature, said urethane decomposes into an amine, an isoolefin, and carbon dioxide; said isoolefin having a boiling point lower than said fusion temperature; said heating being conducted
    at a reaction temperature below said fusion temperature,
    said reaction temperature being sufficient to
      (1) decompose said urethane into said amine, isoolefin and carbon dioxide, and
      (2) sufficient to volatilize said isoolefin.

4. A process for the preparation of a foamed plastic, said process comprising
heating a primary expandable plastic composition comprising
  (A) a polyvinyl halide,
  (B) a plasticizer,
  (C) a polyvinyl halide heat stabilizer, and
  (D) a monomeric urethane of a saturated monohydric tertiary alcohol, said urethane having a decomposition temperature lower than the fusion temperature of said polyvinyl halide, such that, at said decomposition temperature said urethane decomposes into an amine, an isoolefin, and carbon dioxide, said isoolefin having a boiling point lower than said fusion temperature and corresponding to said alcohol, said alcohol having from 4 to about 8 carbon atoms and being free of active hydrogens other than the hydrogen in the hydroxy radical of said alcohol; said heating being conducted
    at a reaction temperature sufficient to
      (1) decompose said urethane into said amine, said isoolefin, and said carbon dioxide, and
      (2) volatilize said isoolefin,
    said reaction temperature being below said fusion temperature.

5. A process for generating a blowing gas in a plastic composition, said process comprising
heating an expandable mixture comprising
  (A) a polyvinyl halide,
  (B) a plasticizer for said polyvinyl halide,
  (C) a heat stabilizer for said polyvinyl halide, and
  (D) a monomeric urethane of a saturated monohydric tertiary alcohol;
    at a reaction temperature sufficient to decompose said urethane into an amine and a blowing gas comprising a mixture of carbon dioxide and an isoolefin vapor, said reaction temperature being below the fusion temperature of said polyvinyl halide,
    said urethane having a decomposition temperature below said fusion temperature whereat said urethane is decomposed into said amine, said carbon dioxide, and said isoolefin;
    said isoolefin corresponding to said alcohol and having a boiling point below said fusion temperature, said alcohol having from 4 to about 8 carbon atoms and being free of active hydrogens other than the hydrogen atom within said alcohol.

6. A process for the preparation of a cellular plastic reaction product, said process comprising
(I) heating an expandable primary mixture comprising
  (A) a polyvinyl halide and
  (B) a monomeric urethane of a saturated monohydric tertiary alcohol, said urethane having a decomposition temperature lower than the fusion temperature of said polyvinyl halide, whereat, said urethane decomposes into an amine, an isoolefin, and carbon dioxide, said isoolefin having a boiling point lower than said fusion temperature and corresponding to said alcohol, said alcohol having from 4 to about 8 carbon atoms and being free of active hydrogens other than the hydrogen in the hydroxy radical of said alcohol;
    at a reaction temperature sufficient to
      (1) decompose said urethane into said amine, said isoolefin, and said carbon dioxide, and
      (2) volatilize said isoolefin;
    thereby forming a resultant expandable composition comprising said polyvinyl halide and whereby said carbon dioxide and said isoolefin expand said resultant expandable composition forming a cellular intermediate, and
(II) subsequently heating said cellular intermediate at a temperature sufficient to fuse said polyvinyl halide, thereby forming said cellular reaction product.

7. A process for the preparation of a polyvinylhalide cellular reaction product, said process comprising
  (A) forming a primary plastic composition containing a polyvinyl halide and a monomeric urethane, said urethane having a decomposition temperature below the fusion temperature of said polyvinyl halide, whereat said urethane decomposes into an amine, carbon dioxide, and an isoolefin, said isoolefin having a boiling point below said fusion temperature, by reacting an organic isocyanate with a saturated monohydric tertiary alcohol in the presence of said polyvinyl halide and a plasticizer for said polyvinyl halide; said isocyanate having from about 6 to about 19 carbon atoms and at least one reactive isocyanate group, said alcohol having from 4 to about 8 carbon atoms and being free of active hydrogens other than the hydrogen in the hydroxyl radical of said alcohol;
  (B) heating said primary composition thereby produced at a reaction temperature sufficient to (1) decompose said urethane into said amine and a blowing gas comprising said carbon dioxide and a vapor of said isoolefin, and (2) concurrently react said amine with an additional quantity of said isocyanate to form a substituted urea-containing polyvinyl halide composition, said reaction temperature being below the fusion temperature of said polyvinyl halide, whereby said blowing gas expands said urea-containing composition forming a cellular intermediate; and
(C) heating said cellular intermediate thereby produced at a temperature sufficient to fuse said polyvinyl halide, thereby forming said cellular reaction product.

8. A process for the preparation of a foamed plastic product having a matrix comprising a polyvinyl halide, a polyurethane, and a polyurea, said process comprising
(A) heating a primary plastic composition comprising a polyvinyl halide, a plasticizer, a heat stabilizer for said polyvinyl halide, a catalyst, a polyhydric alcohol having a plurality of carbinol radicals bonded to at least one, but not more than two, carbon atoms in said alcohol, an organic isocyanate having from 6 to about 19 carbon atoms and at least two reactive isocyanate groups, and a saturated monohydric tertiary alcohol having from 4 to about 8 carbon atoms, said tertiary alcohol being free of active hydrogens other than the hydrogen in the hydroxyl radical of said alcohol, at a temperature sufficient to
(1) react said polyhydric alcohol with a portion of said isocyanate to form said polyurethane, and
(2) react said monhydric tertiary alcohol with and additional portion of said isocyanate to form a monomeric urethane,
said monomeric urethane having a decomposition temperature lower than the fusion temperature of said polyvinyl halide, such that at said decomposition temperature, said monomeric urethane decomposes into an amine, carbon dioxide, and an isoolefin, said isoolefin corresponding to said monohydric tertiary alcohol and having a boiling point lower than said fusion temperature;
(B) subsequently heating the monomeric urethane-containing plastic composition thereby produced at a reaction temperature sufficient to
(1) decompose said monomeric urethane into said amine, said olefin, and said carbon dioxide,
(2) substantially the remainder of said isocyanate with said amine thereby forming said polyurea; said reaction temperature being below the fusion temperature of said polyvinyl halide, whereby said carbon dioxide and said isoolefin vapor expand the polyvinyl halide, polyurea, and polyurethane-containing composition thereby produced forming a cellular intermediate, and
(C) subsequently heating said cellular intermediate at a temperature sufficient to fuse said polyvinyl halide, thereby forming said foamed plastic product; said process being carried out under substantially anhydrous conditions.

9. In a process for the preparation of a polyvinyl halide cellular reaction product from a reaction mixture comprising a polyvinyl halide, an organic isocyanate, and an active hydrogen compound, the improvement which comprises expanding said reaction mixture with a blowing gas comprising a mixture of carbon dioxide and an isoolefin, said blowing gas being produced by
heating a monomeric urethane of a saturated monohydric tertiary alcohol, said urethane being incorporated in said reaction mixture,
said urethane having a decomposition temperature lower than the fusion temperature of said polyvinyl halide, whereat, said urethane decomposes into an amine, an isoolefin, and carbon dioxide, said isoolefin having a boiling point lower than said fusion temperature and corresponding to said alcohol, said alcohol having from 4 to about 8 carbon atoms, and being free of active hydrogens other than the hydrogen in the hydroxy radical of said alcohol;
at a reaction temperature sufficient to
(1) decompose said urethane into said amine, said isoolefin, and said carbon dioxide, and
(2) volatilize said isoolefin,
said reaction temperature being below said fusion temperature.

10. In a process for the preparation of a polyvinyl halide cellular reaction product from a reaction mixture comprising an organic isocyanate, a polyester polyhydric alcohol, and a polyvinyl halide, the improvement which comprises expanding said reaction mixture with a blowing gas comprising carbon dioxide and an isoolefin vapor, said blowing gas being produced by heating said reaction mixture in the presence of a monomeric urethane of a monohydric tertiary alcohol, at a reaction temperature below the fusion temperature of said polyvinyl halide, said reaction temperature being sufficient to
(1) decompose said monomeric urethane into the corresponding amine, carbon dioxide and isoolefin, and
(2) volatilize said isoolefin;
said urethane having the formula $$\left[\begin{array}{c} R_1R_2HC^1 \\ R_3R_4HC^2-C-O-C-N-R \\ R_5R_6HC^3 \quad \quad O \quad H \end{array}\right]_a$$

wherein R is selected from the class consisting of inert organic hydrocarbon radicals and isocyanate substituted organic radicals, said radicals having from about 6 to about 19 carbon atoms,
$R_1$, $R_3$ and $R_5$ are selected from the class consisting of hydrogen and alkyl radicals having from one to four carbon atoms;
$R_2$, $R_4$ and $R_6$ are selected from the class consisting of hydrogen, fluorine, chlorine, and alkyl radicals having not more than two carbon atoms;
such that the total number of carbon atoms in $R_1$ to $R_6$ does not exceed four, and that a total of at least five hydrogen atoms are bonded to carbon atoms $C^1$, $C^2$, and $C^3$.

11. In a process for the preparation of a polyvinyl halide cellular reaction product from a reaction mixture comprising a polyvinyl halide, an active hydrogen compound and an isomeric mixture of toluene diisocyanates, the improvement which comprises expanding said reaction mixture with a blowing gas comprising carbon dioxide and an isoolefin vapor,
said blowing gas being produced by heating said reaction mixture in the presence of a mixture of urethanes at a reaction temperature sufficient to
(1) decompose said urethanes into the corresponding amines, said carbon dioxide and said isoolefin, and
(2) volatilize said isoolefin,
said reaction temperature being below the fusion temperature of said polyvinyl halide;
said urethane mixture being a reaction product of said isomeric mixture of toluene isocyanates and a monohydric tertiary alcohol having the formula $$\begin{array}{c} R_1R_2HC^1 \\ R_3R_4HC^2-C-OH \\ R_5R_6HC^3 \end{array}$$

$R_1$, $R_3$ and $R_5$ are selected from the class consisting of hydrogen and alkyl radicals having from one to four carbon atoms;
$R_2$, $R_4$ and $R_6$ are selected from the class consisting of hydrogen, fluorine, chlorine, and alkyl radicals having not more than two carbon atoms;
such that the total number of carbon atoms in $R_1$ to $R_6$ does not exceed four, and that a total of at least five hydrogen atoms are bonded to carbon atoms $C^1$, $C^2$, and $C^3$.

12. A fused reaction product produced by heating a mixture comprising 100 parts of a polyvinyl halide and, per each 100 parts of said polyvinyl halide:
between about 15 to about 75 parts of plasticizer;

between about 5 to about 35 parts of an inert organic liquid having a boiling point within the range of from about 15 to about 150° C.;

between about 3 to about 50 parts of an alcohol selected from the class consisting of polyhydric primary and secondary alcohols;

between about 2 to about 6 parts of a heat stabilizer for a polyvinyl halide;

between about 2 to about 6 parts of a foam stabilizer;

between about 18 to about 70 parts of a non-ionic organic polyisocyanate having the formula $$R^a(NCO)_x$$

wherein $R^a$ is an organic hydrocarbon radical having about 6 to about 13 carbon atoms and $x$ is an integer having a value of one to about 3, and between about 7 to about 25 parts of a monohydric tertiary alcohol having the formula $$R_3R_4HC^2-\underset{\underset{R_5R_6HC^3}{|}}{\overset{\overset{R_1R_2HC^1}{|}}{C}}-OH$$

$R_1$, $R_3$ and $R_5$ are selected from the class consisting of hydrogen and alkyl radicals having from one to four carbon atoms;

$R_2$, $R_4$ and $R_6$ are selected from the class consisting of hydrogen, fluorine, chlorine, and alkyl radicals having not more than two carbon atoms;

such that the total number of carbon atoms in $R_1$ to $R_6$ does not exceed four, and that a total of at least five hydrogen atoms are bonded to carbon atoms $C^1$, $C^2$, and $C^3$.

13. The product of claim 12 wherein said polyvinyl halide resin is polyvinyl chloride.

14. The product of claim 13 wherein said mixture is further characterized in that it contains between about 2 to about 6 parts of a polyvinyl halide heat stabilizer.

15. The product of claim 14 wherein said mixture is further characterized in that it contains from about 0.2 to about 0.6 parts of N-methylmorpholine.

References Cited

UNITED STATES PATENTS

| | | | |
|---|---|---|---|
| 3,200,089 | 8/1965 | Landler et al. | 260—2.5 |
| 3,256,217 | 6/1966 | Landler et al. | 260—2.5 |
| 3,277,028 | 10/1966 | Parker et al. | 260—2.5 |
| 3,290,262 | 12/1966 | Leclerq | 260—2.5 |
| 3,308,074 | 3/1967 | Landler et al. | 260—2.5 |

MURRAY TILLMAN, *Primary Examiner.*

M. FOELAK, *Assistant Examiner.*

UNITED STATES PATENT OFFICE
CERTIFICATE OF CORRECTION

Patent No. 3,338,846                           August 29, 1967

Oskar E. H. Klopfer

It is hereby certified that error appears in the above numbered patent requiring correction and that the said Letters Patent should read as corrected below.

Column 2, in the first formula, for "NC" read -- NCO --; column 8, about line 41, in the right-hand formula, for "$H_2C$" read -- $H_3C$ --.

Signed and sealed this 24th day of September 1968.

(SEAL)
Attest:

Edward M. Fletcher, Jr.                          EDWARD J. BRENNER
Attesting Officer                                    Commissioner of Patents